(12) United States Patent
Werner et al.

(10) Patent No.: US 10,583,689 B2
(45) Date of Patent: Mar. 10, 2020

(54) WHEEL SPIDER WITH ASSEMBLED SPOKE ELEMENTS AND CONNECTION OF WHEEL SPIDER TO RIM WELL

(71) Applicant: THYSSENKRUPP CARBON COMPONENTS GMBH, Kesselsdorf (DE)

(72) Inventors: Jens Werner, Coswig (DE); Christian Köhler, Dresden (DE); André Bartsch, Dresden (DE); Michael Dreßler, Dresden (DE); Sandro Mäke, Dohma (DE)

(73) Assignee: THYSSENKRUPP CARBON COMPONENTS GMBH, Kesselsdorf (DE)

( * ) Notice: Subject to any disclaimer, the term of this patent is extended or adjusted under 35 U.S.C. 154(b) by 278 days.

(21) Appl. No.: 15/630,163

(22) Filed: Jun. 22, 2017

(65) Prior Publication Data

US 2017/0282475 A1    Oct. 5, 2017

Related U.S. Application Data

(62) Division of application No. 14/764,254, filed as application No. PCT/EP2014/051543 on Jan. 27, 2014, now Pat. No. 10,189,301.

(30) Foreign Application Priority Data

Feb. 5, 2013   (DE) .......................... 10 2013 201 842

(51) Int. Cl.
| | | |
|---|---|---|
| *B60B 3/10* | (2006.01) | |
| *B60B 1/14* | (2006.01) | |
| *B29C 70/34* | (2006.01) | |
| *B60B 5/02* | (2006.01) | |
| *B29D 99/00* | (2010.01) | |
| *B29C 70/06* | (2006.01) | |
| *B29C 70/30* | (2006.01) | |
| *B60B 3/04* | (2006.01) | |

(Continued)

(52) U.S. Cl.
CPC ............... *B60B 3/10* (2013.01); *B29C 70/06* (2013.01); *B29C 70/30* (2013.01); *B29C 70/345* (2013.01); *B29D 99/0032* (2013.01); *B60B 1/14* (2013.01); *B60B 3/041* (2013.01); *B60B 5/02* (2013.01); *B29K 2105/253* (2013.01); *B29L 2031/32* (2013.01); *B29L 2031/322* (2013.01); *B60B 2310/204* (2013.01); *B60B 2310/241* (2013.01); *B60B 2360/341* (2013.01); *B60B 2900/111* (2013.01); *B60B 2900/311* (2013.01)

(58) Field of Classification Search
CPC ............................... B29C 70/06; B29C 70/30
See application file for complete search history.

(56) References Cited

U.S. PATENT DOCUMENTS

| 1,206,887 | A | 12/1916 | Murray | |
|---|---|---|---|---|
| 2010/0019564 | A1* | 1/2010 | Theuer | B29C 70/347 301/64.703 |

\* cited by examiner

*Primary Examiner* — Austin Murata
(74) *Attorney, Agent, or Firm* — McGlew and Tuttle, P.C.

(57) ABSTRACT

A wheel includes a rim having a rim well and rim flanges, a hub, and at least three spoke elements. Each spoke element forms at least one spoke between the hub and the rim. The spoke elements are fastened to an inside of the rim in a form-closed manner or a form-closed and bonded manner. In the hub region, the spoke elements are supported on each other in a circumferential direction at abutting surfaces designed therefor. A method for producing the wheel is provided.

20 Claims, 13 Drawing Sheets

(51) Int. Cl.
*B29L 31/32* (2006.01)
*B29K 105/00* (2006.01)

WHEEL SPIDER WITH ASSEMBLED SPOKE ELEMENTS AND CONNECTION OF WHEEL SPIDER TO RIM WELL

CROSS REFERENCE TO RELATED APPLICATIONS

This application is a divisional under 37 CFR 1.53(b) of pending prior application Ser. No. 14/764,254 filed Jul. 29, 2015 and claims the benefit (35 U.S.C. § 120 and 365(c)) of International Application PCT/EP2014/051543 filed Jan. 27, 2014, which designated inter alia the United States and which claims the priority of German Patent Application 10 2013 201 842.8 filed Feb. 5, 2013, the entire contents of each application are incorporated herein by reference.

FIELD OF THE INVENTION

The subject of the present patent application is a wheel, preferably for motor vehicles, with spokes, wherein the spokes border directly on one another in the hub area in the circumferential direction and are fixed by two hub parts in the axial direction. On the rim side, the spokes are fastened to the inside (the side facing the axle) of the rim well. Furthermore, a process for manufacturing the wheel made of fiber composite material according to the present invention is disclosed.

BACKGROUND OF THE INVENTION

There are a variety of wheel constructions for motor vehicles, especially automobiles. Frequently, these wheels are manufactured from one piece. Advanced constructions provide the manufacture from a plurality of individual parts. This is especially the case in the constructions made of fiber-reinforced plastics currently being developed. Efforts are made to overcome the limitations in the design freedom that result from the technological constraints of the manufacturing process. Thus, DE 10 2006 051867 suggests a wheel made of fiber-reinforced plastic, in which the spokes are formed by loops made of reinforcement material, which are designed as deflected at the hub, following the inside of the rim and abutting one another in the intermediate space between the hub and the rim. The thus resulting wheel spider is connected in substance to the rim which is likewise manufactured from fiber-reinforced material. Due to the design here, no sufficient variations of the design of the wheel spider are possible.

Other known constructions attempt to overcome these drawbacks by milling out openings between the spokes made of fiber-reinforced solid material (e.g., a disk which may also be contoured). In this process, however, it is disadvantageous that the fiber reinforcement becomes damaged, which leads to losses of strength.

DE 10 2010 010512 A1 provides a wheel spider, which is connected to the rim well in a non-positive-locking or positive-locking manner. The wheel spider consists of fiber composite material or metal. It is disadvantageous that the wheel spider must be premanufactured and cannot be manufactured in conjunction with the manufacture of the entire wheel. The transmission of forces between the metal and the fiber composite material of the rim is problematic in a wheel spider made of metal. The different coefficients of expansion of the materials may contribute to damage.

U.S. Pat. No. 7,669,940 B2 takes a different approach. A wheel disk designed as a full-surface disk is concealed by means of preset spokes here. In a preferred embodiment, these spokes are designed as loop-like structures, which abut one another directly in the hub area and run together in the intermediate space between the hub and the rim as well. The fastening in the hub area takes place by means of a union ring and bolt connections. These spokes are fastened to the rim by means of bolt connection in an essentially axially parallel direction. The spokes are used exclusively for decoration purposes and they do not assume a load-bearing function. Accordingly, provisions are made for them to be made of a plastic material and to keep the connection to the wheel in a detachable manner. Due to the function of the spoke construction as a pure protruding part for a disk wheel, the weight of the wheel is increased disadvantageously.

SUMMARY OF THE INVENTION

Thus, an object is to provide a wheel construction that overcomes the limitations in the design freedom of the wheel spider and nevertheless meets the weight and strength requirements of the modern automobile construction. A process for the manufacture of such a wheel construction shall be provided.

The wheel according to the present invention has a rim with rim well and rim flanges, a hub as well as at least three spoke elements, which form spokes between the hub and rim. The spoke elements are fastened to the inside of the rim in a positive-locking manner or in a positive-locking manner and in substance. The spoke elements abut one another in the circumferential direction and they are supported on one another in the hub area. For this, they have plane abutting surfaces, on which they abut one another. In the axial direction, the spoke elements are preferably fixed by two hub parts, between which they are inserted. These hub parts face one another on the axle, and the spoke element ends are arranged between them. Preferably, the hub parts touch the spoke element ends directly and hold them.

The hub parts act as force application elements and transmit axial force components that act on the wheel, on the axle and vice versa. They preferably consist of fiber-reinforced material (preferably identical to the material of the rim or of the spoke elements). Preferred embodiments provide hub parts made of metal, preferably steel, aluminum or magnesium or suitable alloys from the state of the art. Preferably, the hub parts have bolt holes for the fastening bolts of the wheel. Furthermore, the hub parts or one of the hub parts also have a central axial hole, when the design of the wheel requires one. Preferably, the hub parts have a flange-like design and face one another extensively. Another preferred embodiment provides, however, pins at one or at both hub parts, which mesh between the spokes in a claw-like manner and extend up to the opposite hub part or the pins of the opposite hub part. The pins advantageously support transmission of radial forces onto the spokes. The pins of the two hub parts may also be arranged in an alternating manner. Preferably, a slight space remains between the pins of opposite hub parts or between the pins of one hub part and the other hub part in order to prevent the clamping force applied via the bolts during the assembly of the wheel from being completely absorbed by the pins. This force shall preferably act on the spoke element ends, which are clamped between the two hub parts. In a preferred embodiment, the pins have threaded holes, which correspond to bolt holes of the opposite hub part. In this way, the hub parts may hold the ends of the spoke elements without having to establish a connection in substance to same. This is especially advantageous if the spoke elements contain moldings and are provided during the manufacture in an unconsolidated state, since the holding together of the hub area of the wheel can be ensured in this way. Hub area is defined as the area of the spoke elements, which is located between the geometric wheel axle and the radially outer ends of the hub parts, i.e., the spoke element sections covered by the hub parts in the front and rear views of the wheel.

The spokes of the wheel according to the present invention assume the transmission of the forces occurring during the vehicle operation. Thus, they are not pure decorative elements. The use of the wheels according to the present invention is intended especially for automobiles, trucks, buses and other commercial vehicles.

In a preferred embodiment, the abutting surfaces of the spoke elements are contoured, such that they mesh with one another in an ideal form. For this purpose, the spoke elements have, e.g., elevations on one side (as viewed in the direction of rotation) and depressions on the other side in a preferred embodiment. The elevations and depressions of adjacent spoke elements then mesh with each other in a positive-locking manner.

Each spoke element consists of one or a plurality of textile strands or layers of textile strands. The fiber reinforcements in the textile strands are preferably unidirectional and directed parallel to the longitudinal axis of the spoke or from the hub to the rim. Moreover, layers, in which unidirectional fibers are extensively held together, are preferred. Here also, the layers or the unidirectional fibers of the layers are directed parallel to the longitudinal axis of the spoke or directed from the hub to the rim. The layers superimposed on each other are preferably stitched together (stitched). Provisions are made in a preferred embodiment to wrap the textile strands with one or more layers of textile in order to hold these together in the unconsolidated state and to offer a better protection against lateral stresses in the consolidated state. In preferred embodiments the layers are arranged in layers on one another or arranged in the axial direction (FIG. 4b) or in the circumferential direction.

Especially advantageously, the alignment of the layers is selected such that a layerwise folding can take place during a later distribution of the layers at a spoke end or for connection to the rim or for inserting moldings, and no layers have to be cut.

In a first simple embodiment, each spoke element forms an individual spoke that extends from the hub to the rim. In this connection, this spoke may already have cross-sectional variations along the longitudinal axis or bends as design elements. The longitudinal axis of the spoke is defined here as the axis along the greatest extension of the spoke. A spoke element forms two, three, four or more spokes in preferred embodiments. It is especially preferred that two or more spokes are formed in a spoke element, whereby the textile strands of a spoke are split in the radial direction and converge with the split textile strands of other spokes (FIG. 9). This may also take place repeatedly, such that grids or rhombus-like structures or other decorative designs are possible.

In another preferred embodiment, moldings are inserted into the spoke elements, which are used to preset and fix the desired spoke shape. These moldings preferably consist of materials, which are very easily combined with the matrix material and/or the fiber reinforcements (e.g., melting during the consolidation, among others). The spokes may have any desired cross sections, which make possible a load-capable design of the wheel spider, and rectangular and/or square cross sections are preferred. Furthermore, round, oval or polygonal cross sections are also preferred, however. The cross sections may also vary along the longitudinal axes of the spokes.

In a preferred embodiment, the spoke elements have moldings in the hub area in their interior. In a first preferred embodiment, the moldings are covered entirely by the fiber-reinforced material of the spokes. In a further, preferred embodiment, the moldings at the end facing the axle extend up to the surface (the end of the spoke) and transmit contact forces. These moldings are covered in the axial direction by layers of textile strands (front and rear sides of the spoke elements) in a further, especially preferred embodiment. In the circumferential direction, they extend up to the surface of the elements, so that the forces occurring at the abutting surfaces of the spoke elements are absorbed or transmitted by the moldings. In still another preferred embodiment, the moldings extend in the axial direction or in the axial and circumferential directions up to the surface of the spoke elements. The moldings in the hub area preferably consist of metal (e.g., steel, aluminum). They may also protrude within the spoke elements beyond the hub area in the direction of the rim and thus achieve an improved transmission of forces between the hub and the rim.

The spoke elements are assembled and thus form the wheel spider. Thereby, the spoke elements in the wheel hub area preferably have an axially directed cone or conical surfaces, which function as abutting surfaces. They are preferably pressed together and held in the axial direction by means of tension plates, which function as hub parts (force application elements).

In a preferred embodiment, the abutting surfaces of adjacent spoke elements lie on one another directly and without intermediate components. In a further preferred embodiment, intermediate elements, which transmit the circumferential forces, lie between two adjacent abutting surfaces. The intermediate elements preferably consist of metal, but plastics and ceramics are also possible.

The spoke elements are preferably connected to the rim well via an undercut connection, whereby preferably the ends of the textile spoke preform are connected in a positive-locking manner to the rim well by means of braiding (preforming of the rim well by means of the braiding process). Preferred embodiments provide for dividing the textile strands that form the spoke elements and for arranging them in the rim area, so that they follow the rim shape in the axial direction or else in the circumferential direction (in both directions of rotation of the wheel) and thus form a positive-locking connection.

The spoke elements have the necessary openings for fastening bolts, which correspond to the corresponding openings of the hub parts. These openings are created by corresponding braiding during the manufacture of the textile layers or by means of piercing a prepared spoke element in the unconsolidated state, with the fibers remaining preferably undamaged. This is achieved by the openings not being punched, but rather created advantageously by means of a mandrel by displacing the fiber layers. If moldings are to be used in the hub area of the spoke elements, then these have advantageously the necessary openings for the bolt holes. Preferably, the openings for the fastening bolts are generated by means of CNC finishing.

The wheel according to the present invention preferably consists entirely of fiber composite material. It is preferably a resin matrix with carbon fiber, fiberglass, metal or aramid fiber reinforcement. Further preferred embodiments are mixed forms with metal spoke elements and rim made of fiber-reinforced material or fiber-reinforced spokes, which are connected to a metal rim. A wheel construction that consists entirely of metal is also possible. Suitable metals are known from the state of the art (steel, aluminum, magnesium, light metal alloys).

The wheel construction according to the present invention advantageously does not require any CNC finishing. It achieves the high weight-saving potential of the wheel spider in compliance with the strength requirements set in the automotive industry. In particular, the wheel construction according to the present invention offers a high design freedom for spoked wheels.

The process for manufacturing the wheel construction according to the present invention made of fiber-reinforced material provides that the individual spoke elements are prefabricated from fiber layers and provided in the unconsolidated state. The spoke elements are inserted into a mold in such a way that they touch each other in the hub area in the circumferential direction. The mold is closed, whereby the spoke ends, which shall establish the connection to the rim, remain exposed. These spoke ends are split axially into two portions in a first preferred procedure and the portions are fitted axially in opposite directions into the mold of the rim well. Subsequently, the rim well is manufactured by braiding over, whereby a positive-locking connection of the spoke ends at the rim well is achieved. In a further preferred procedure, the fiber layers of the spoke ends are distributed parallel to the axis, so that a bending over of the ends is carried out in and against the direction of rotation. Here also, subsequent to the manufacture of the rim, it is braided over. Finally, the rim and spokes can be impregnated together with the matrix material and consolidated. Finally, the front hub part and the rear hub part (force application element) are mounted in the hub for the axial stabilization of the spokes. In a preferred procedure, the hub parts are inserted into the mold and hold the spoke elements during the braiding over. They are already integrated into the wheel in the course of the consolidation.

A further preferred procedure for manufacturing the wheel according to the present invention provides that the spoke elements consist of fiber-reinforced material which is partially or even entirely preconsolidated. The spoke elements are then inserted into the mold and braided over with the reinforcement material of the rim well, which is subsequently consolidated. Hybrid wheels, in which the spoke elements consist of metal, are manufactured in an analogous manner. These spoke elements are inserted into the mold and likewise braided over at the rim-side ends.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4a is a perspective view of the portion showing the basis of the sectional views of FIGS. 4b and 4c;

FIG. 4b is a view showing the stratification of the fiber layers in the axial direction as indicated by the section line of FIG. 4a;

FIG. 4c is a view showing the stratification of the fiber layers in the circumferential direction as indicated by the section line of FIG. 4a;

DESCRIPTION OF THE PREFERRED EMBODIMENTS

Figure 1:
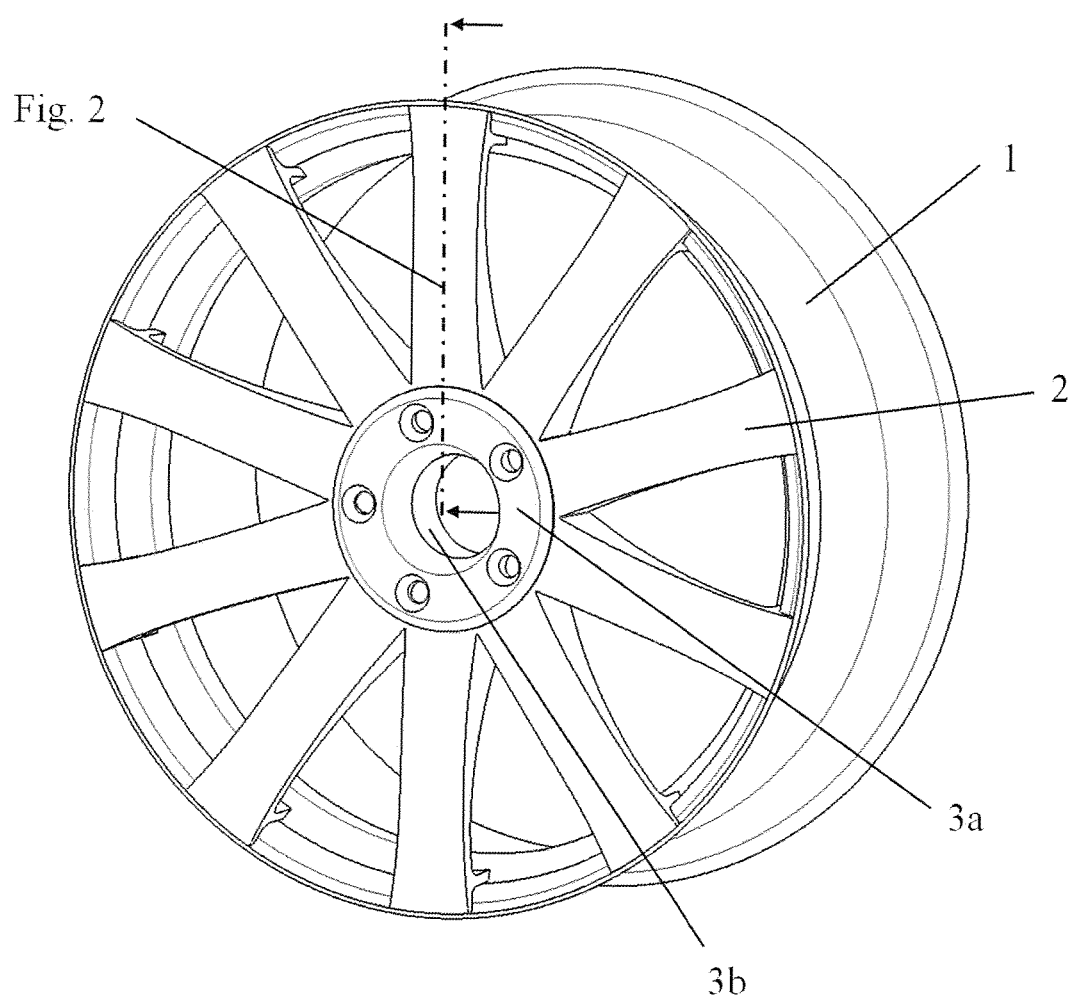
FIG. 1 is a perspective view of exemplary embodiment 1.
Figure 2:
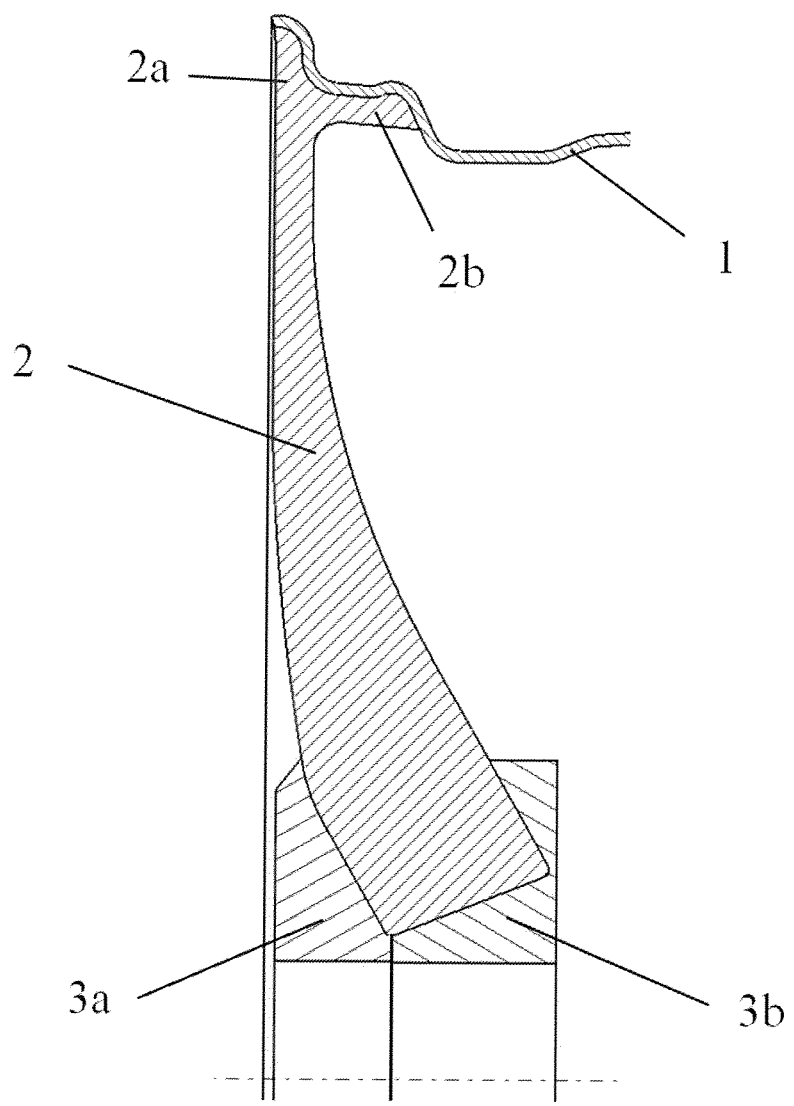
FIG. 2 is a sectional view taken along the line indicated by the arrows in FIG. 1.
Figure 3:
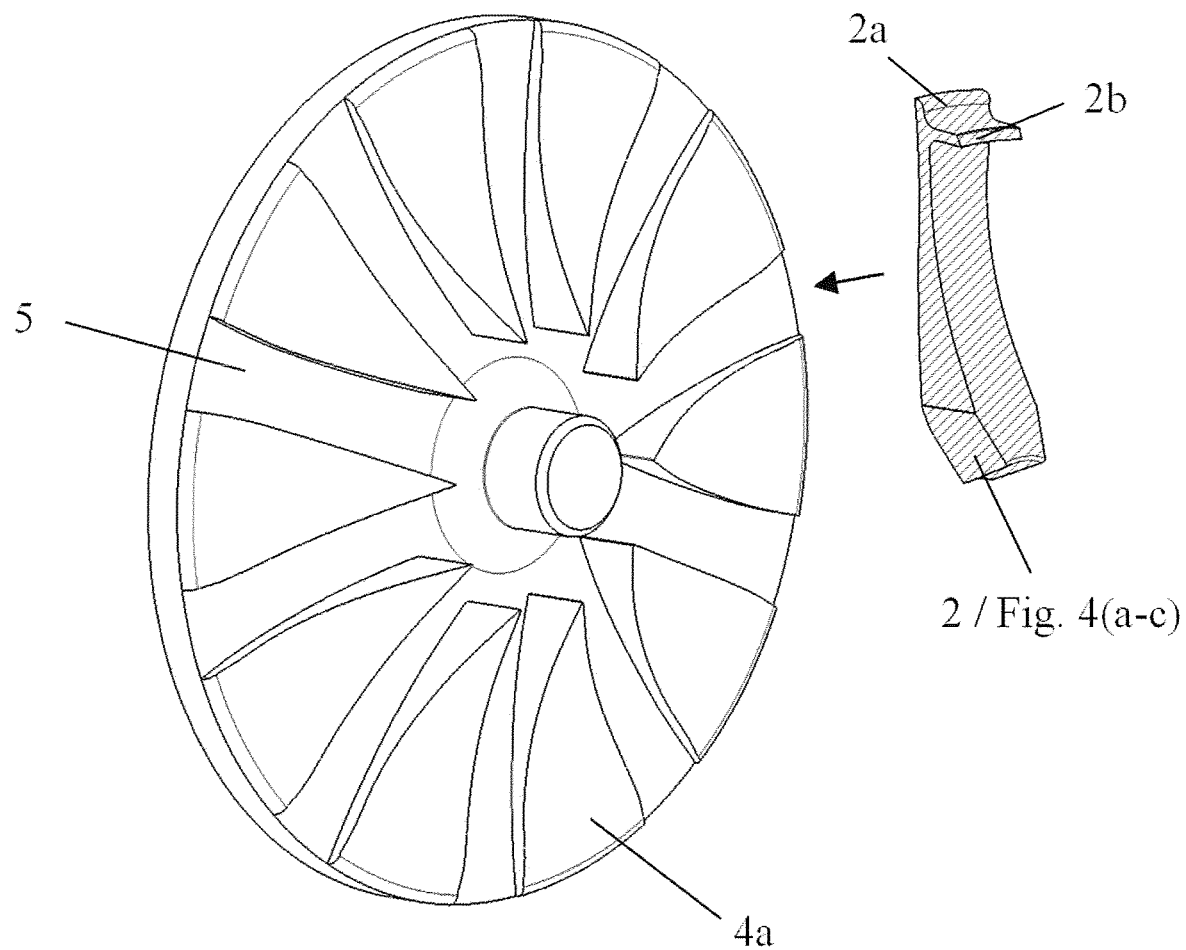
FIG. 3 is a perspective view of exemplary embodiment 1 also showing a portion that is the basis for FIGS. 4a-4c.
Figures 4A, 4B, 4C:
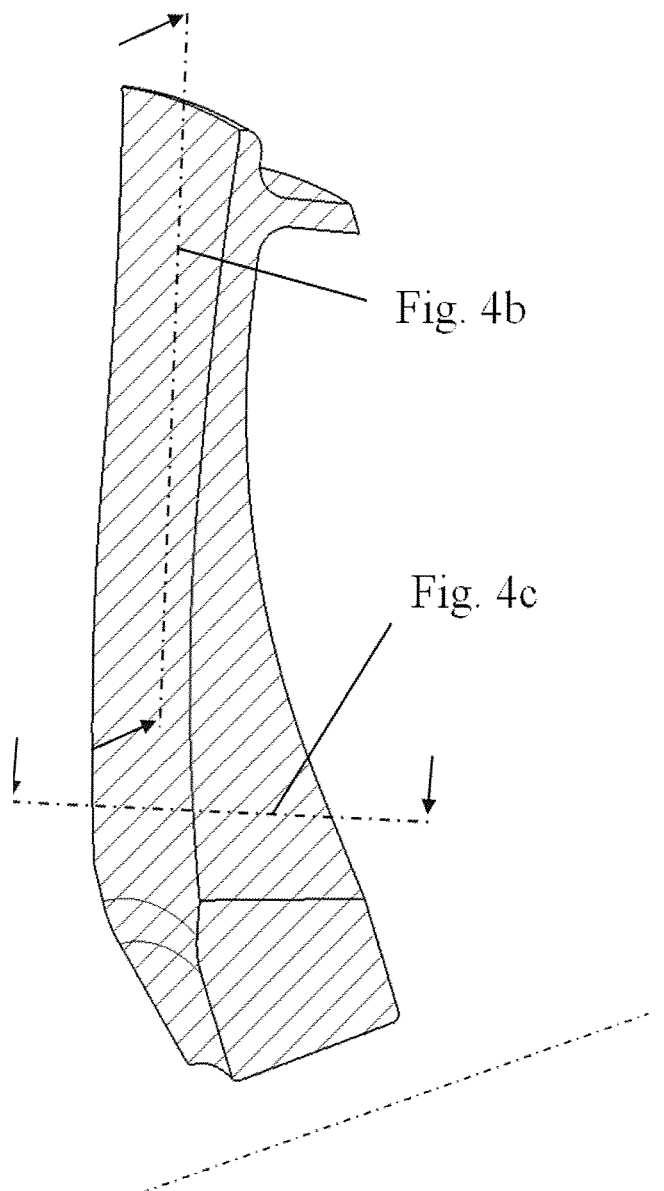
Figure 4B:
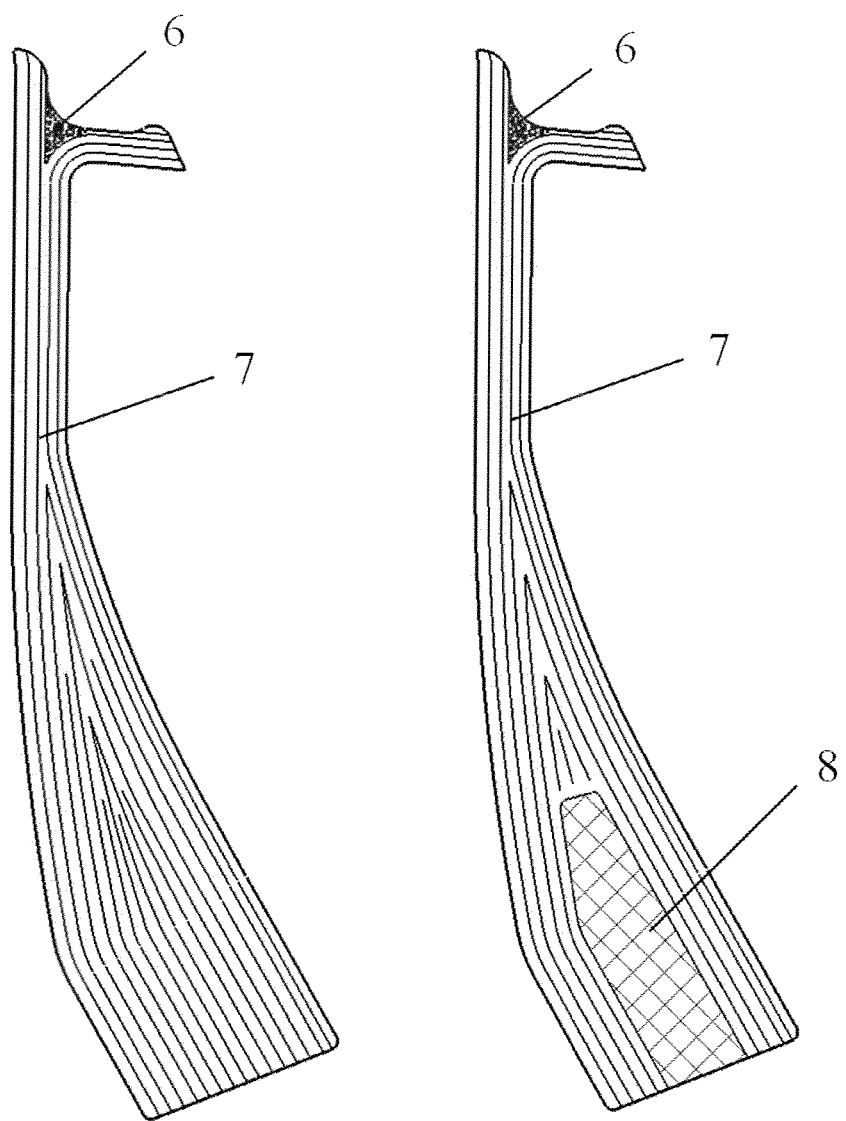
Figure 4C:
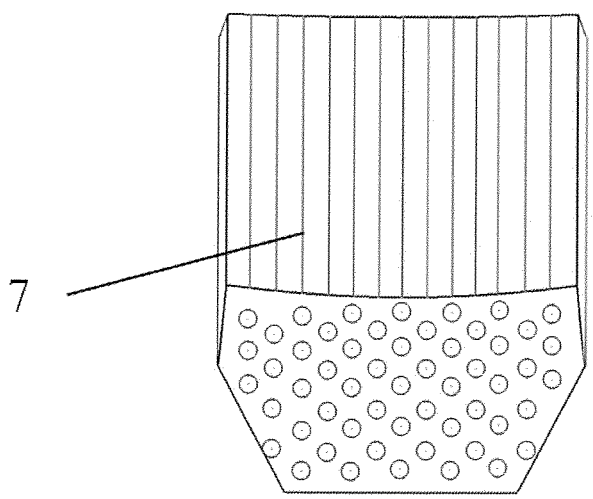
Figure 5:
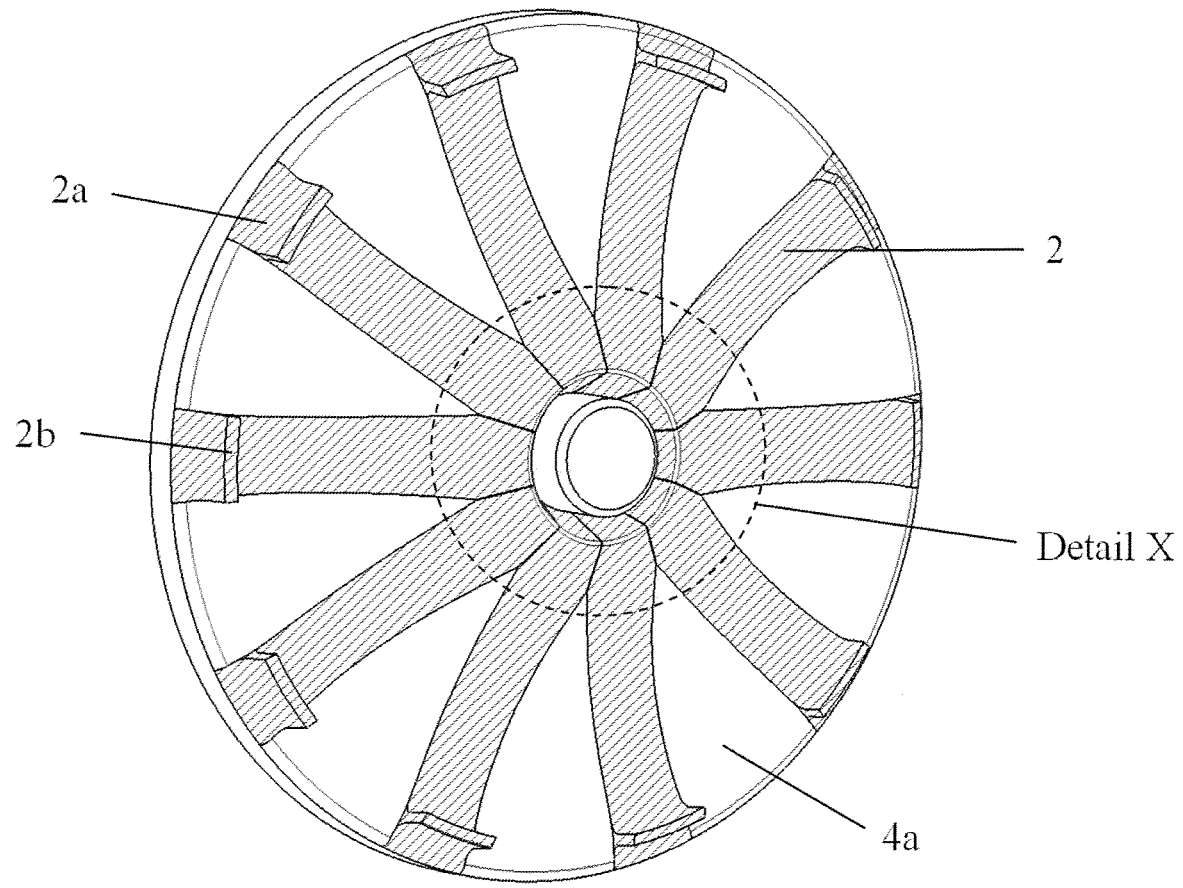
FIG. 5 is a perspective view of the exemplary embodiment 1 also showing a Detail X as indicated.
Figure 5A:
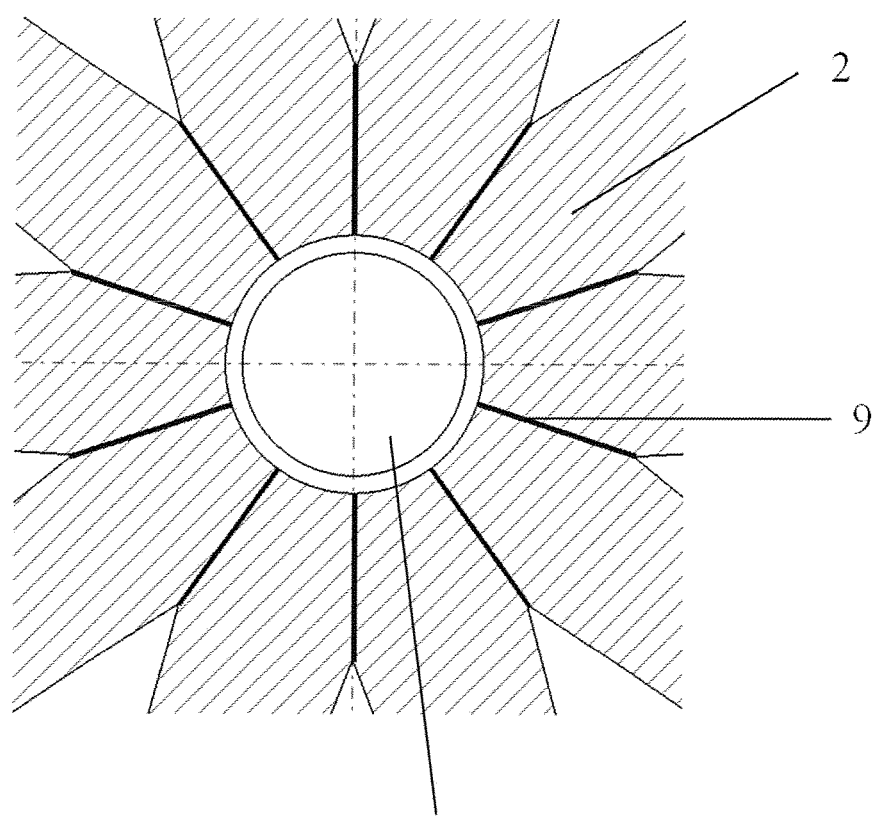
FIG. 5A is an enlarged view of Detail X of FIG. 5.
Figure 6:
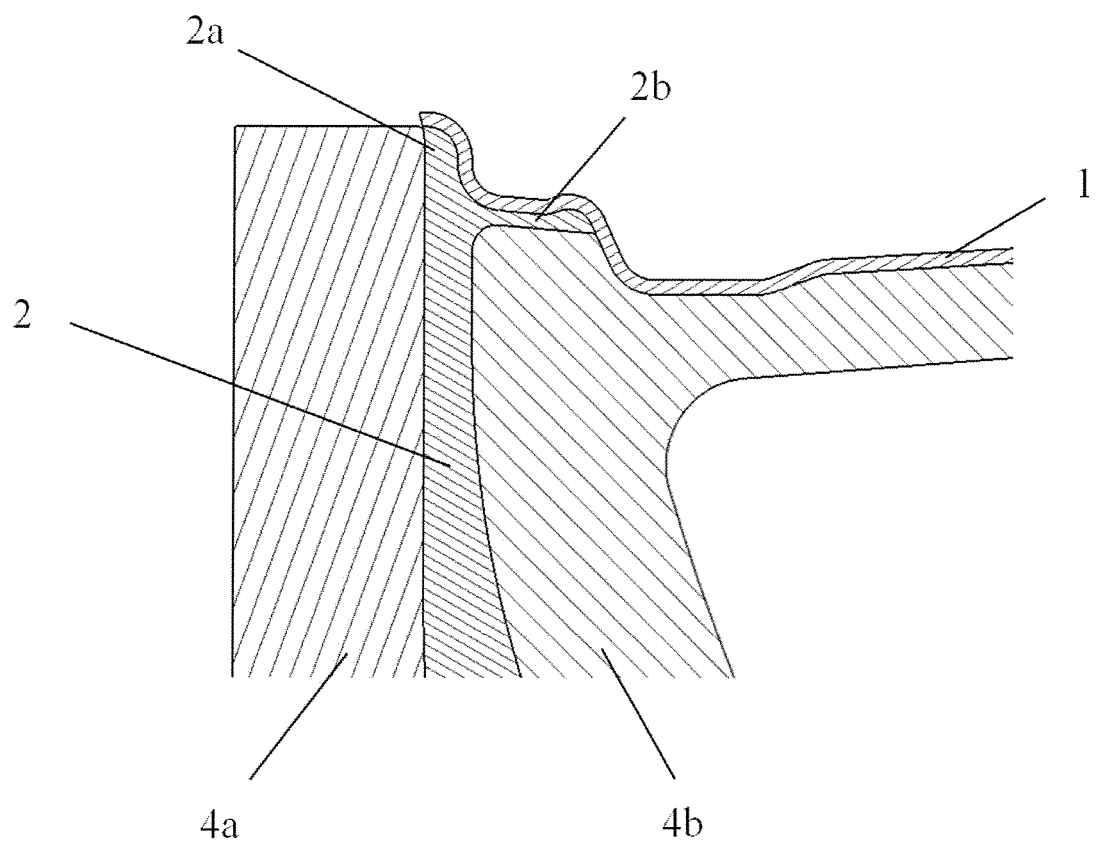
FIG. 6 is a sectional view of the exemplary embodiment 1.

Exemplary Embodiment 1 According to FIG. 1, FIG. 2, FIG. 3, FIG. 4(a-c), FIG. 5, and FIG. 6:

In the first exemplary embodiment, the wheel spider is made up of individual radial spoke elements (2), which are assembled in the area of the wheel hub. The spoke elements which are assembled over circumferentially directed connecting surfaces in this case form the wheel hub. The molding of the spokes takes place in advance, for example, by means of TFP technology (Tailored Fiber Placement Technology), with which the individual textile strands are made up of a plurality of already dimensioned fiber layers and thus, the unconsolidated final contour can be produced, taking into account the later spoke shape. In this connection, the stratification of the fiber layers may take place differently, for example, in the axial (FIG. 4b) direction or in the circumferential direction (FIG. 4c). The spoke ends connected to the rim well (1) have two separate textile strands, which, on the one hand, run up to the rim flange (2a), and, on the other hand, produce (2b) the undercut with the rim well (2b) and thus both form a positive-locking connection with the rim well. In an axially stratified fiber layer structure, the individual fiber strands (7) run in this case as shown in FIG. 4b, and as a result of the spreading of the spoke end a gusset area (6) is produced, which is filled by means of the filling material before or during the subsequent braiding process. In thick-walled areas, the individual spoke elements may consist only of fiber strands or even of an additional filling material (8), which is partially or completely surrounded by fiber strands. The spoke elements may have an axially directed cone or conical surfaces in the wheel hub area, over which the assembled spoke elements are clamped or pressed via force application elements. The spoke geometry may have any desired cross section here, and a cross section resolved in the axial direction is preferred.

The inserted spoke elements are connected to one another by means of their common, circumferentially directed joining zones (9) in the area of the wheel central axis. After the prefabricated textile strands (2) are inserted into the corresponding grooves (5) of the outer mold (4a), the inner mold is mounted, which may likewise have grooves for the spoke elements or is equipped with immersion edges for the grooves of the outer mold half. The undercut, which forms at the rim well as a result of the spoke connection, can be avoided by an inserter tool or other structural solutions in order to guarantee a release from the mold. Subsequently, the formation of the rim well (1) takes place by braiding over the molds functioning as braided core as well as the folded spoke ends. Thus, the spokes are axially integrated via a positive-locking connection into the textile structure of the rim well. For the pressing of the textile preform during the consolidation, a multipart outer mold is used in the area of the rim well. After the consolidation, the wheel spider and rim well are connected in a positive-locking manner and connected in substance. The mounting of the wheel bolts is ensured by a front force application element (3*a*) that is bonded to the assembled spoke elements. The contact surface of the wheel to the vehicle is also established via a rear force application element (3*b*) that simultaneously assumes the function of centering. Both force application elements press the assembled spoke elements axially and thus hold them under compressive prestress.

Figure 7:
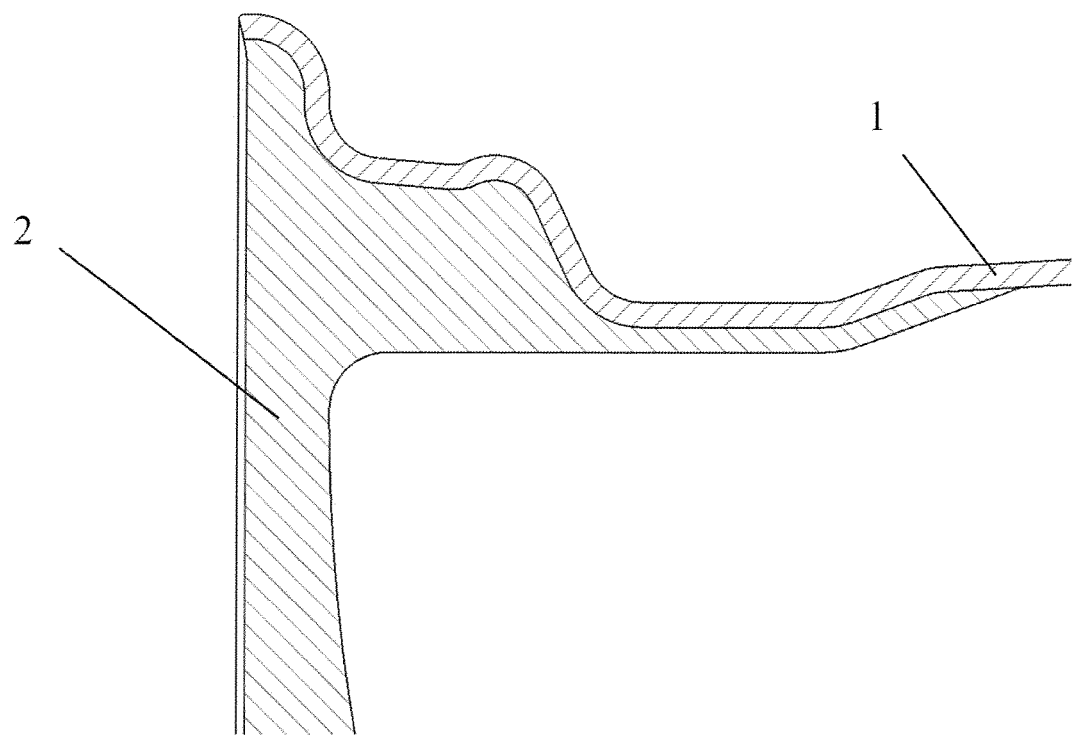
FIG. 7 is a sectional view of the exemplary embodiment 2.
Figure 8:
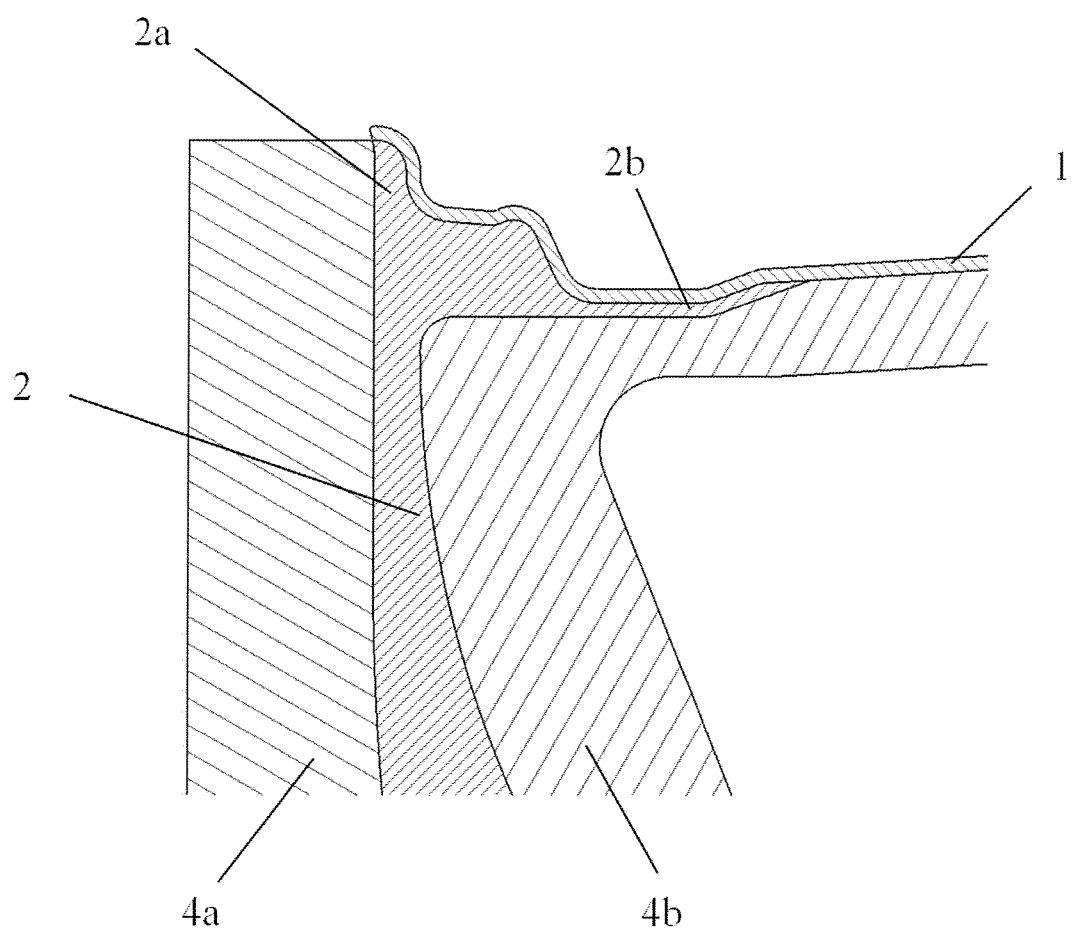
FIG. 8 is a sectional view of the exemplary embodiment 2.

Exemplary Embodiment 2 According to FIG. 7, FIG. 8

The second exemplary embodiment differs from the first one to the effect that the individual spoke elements produce a positive-locking, undercut connection to the entire well of the rim well. Here, the spoke end (2*b*) running to the well is adapted, so that the wall thickness from the rim flange area up to the beginning of the rim well increases markedly and the strap forming the undercut is adapted corresponding to the rim well. This spoke connection makes possible a simplification of the mold by no inserter tool being needed for the undercut formation. The spoke ends (2*b*) enclosing the rim well are therefore inserted into grooves provided for this after mounting the inner mold. The rim well contour necessary for the braiding process is therefore formed by the inner and outer molds as well as the folded-over spoke ends.

Figure 9:
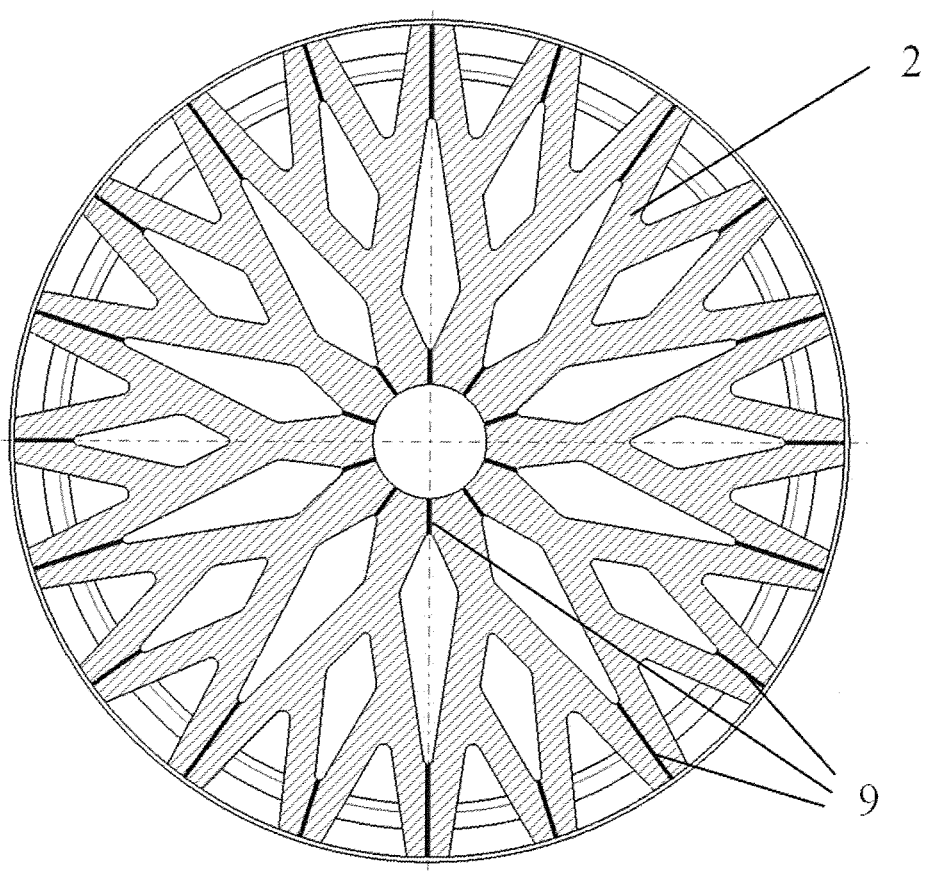
FIG. 9 is a front view of the exemplary embodiment 3.
Figure 10:
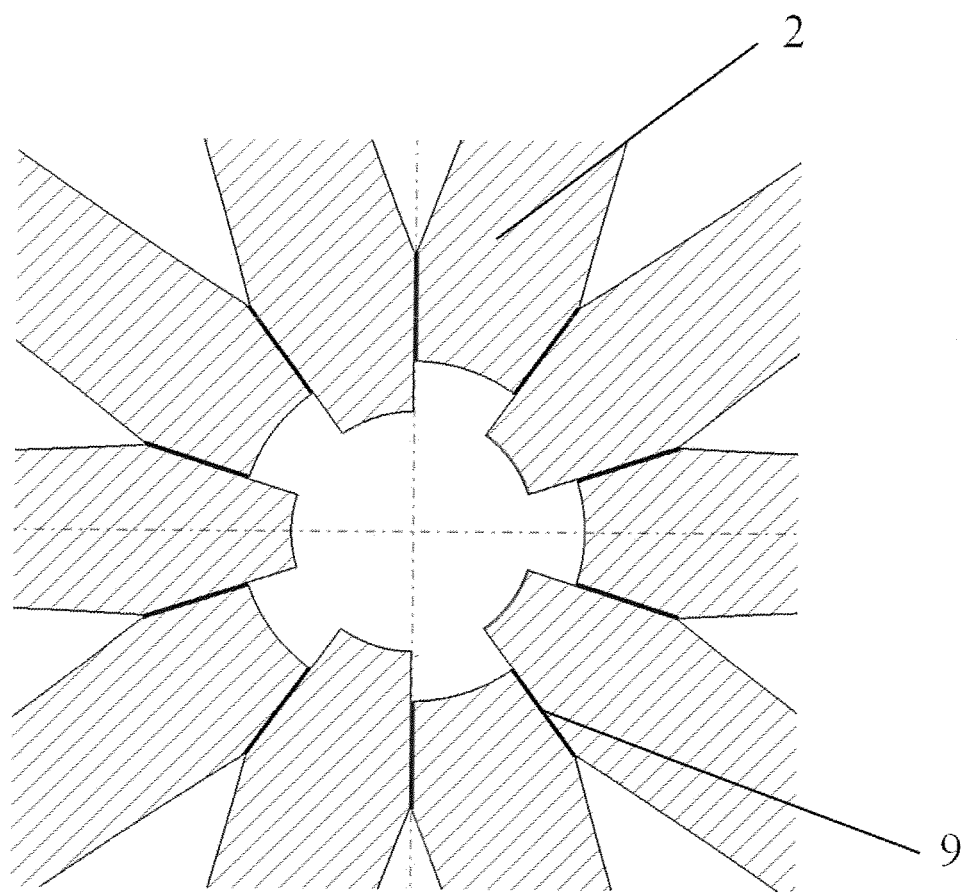
FIG. 10 is an enlarged front view of the exemplary embodiment 3.

Exemplary Embodiment 3 According to FIG. 9, FIG. 10

FIG. 10 schematically shows the joining zones (9) between the individual spoke elements (2), wherein in this case the spoke elements differ in their radial length in the direction of the wheel central axis. Every other spoke thus has a type of recess in the radial direction, after which a stepped wheel hub area forms. The force application elements (3*a*, 3*b*) are designed such that axial bulges mesh with the recesses and thus a non-rotatable connection is produced between the spoke elements and the force application elements and rotational forces can be transmitted better. The spoke elements (2) are held in the axial direction by means of the hub parts (3*a* and 3*b*).

While specific embodiments of the invention have been shown and described in detail to illustrate the application of the principles of the invention, it will be understood that the invention may be embodied otherwise without departing from such principles.

What is claimed is:

1. A process for manufacturing a wheel made of fiber composite material, the process comprising the steps of:
    inserting spoke elements, which comprise one or more textile strands or layers of textile strands, which run parallel to the longitudinal axis of the spoke elements, into a mold;
    closing the mold, wherein spoke element ends remain exposed in a vicinity of a rim and are split into two portions, which are fitted into the mold of a rim well and wherein the closed mold forms the shape of the rim;
    braiding over of the closed mold for manufacturing the rim well;
    consolidating the spoke elements and rim; and
    releasing the wheel from the mold, wherein:
    in the step of closing the mold, wherein the spoke element ends remain exposed in a vicinity of the rim and are split into two portions, the ends of the spoke elements are placed directly abutting one another in the hub area in the mold in the circumferential direction; and
    in the step of braiding over of the closed mold for manufacturing the rim well the ends of the spoke elements are limited by two hub parts in the axial direction.

2. A process in accordance with claim 1, wherein the spoke elements in the hub area are provided in the step of closing the mold with moldings for absorbing forces.

3. A process in accordance with claim 1, wherein in the step of closing the mold, wherein the spoke element ends remain exposed in a vicinity of the rim and are split into two portions, the two portions of the spoke element ends are fitted axially in opposite directions into the mold and thus establish in the step of braiding over of the closed mold a positive-locking connection to the rim well.

4. A process in accordance with claim 1, wherein in the step of closing the mold, wherein the spoke element ends remain exposed in a vicinity of the rim and are split into two portions, the two portions of the spoke element ends are fitted into the mold in opposite directions of rotation of the wheel and thus establish in the step of braiding over of the closed mold a positive-locking connection to the rim well.

5. A process in accordance with claim 1, wherein one of the two portions is located at a first distance from at least one of the two hub parts, another one of the two portions being located at a second distance from the at least one of the two hub parts, the first distance being greater than the second distance.

6. A process in accordance with claim 1, wherein the rim well comprises an outermost circumferential peripheral edge portion and an inner rim well portion located at a radially spaced location from the outermost circumferential peripheral edge portion with respect to a longitudinal axis of the rim well, one of the two portions being located adjacent to the outermost circumferential peripheral edge portion, another one of the two portions being in contact with the inner rim well portion.

7. A process for manufacturing a wheel made of fiber composite material, the process comprising the steps of:
    providing a mold;
    inserting spoke elements, which comprise one or more textile strands or layers of textile strands, which run parallel to a longitudinal axis of the spoke elements, into the mold;
    closing the mold, wherein an end of each of the spoke elements remains exposed in an area of a rim and another end of each of the spoke elements abuts an adjacent another end of the spoke elements in a hub area of the mold in a circumferential direction of the mold, the end comprising a first end portion and a second end portion, the first end portion and the second end portion being fitted into the mold of a rim well, the mold forming a shape of the rim when the mold is in a closed state;
    braiding over of the mold when the mold is closed for manufacturing the rim well, the another end of each of the spoke elements being arranged between two hub parts in the axial direction;
consolidating the spoke elements and the rim; and
releasing the wheel from the mold.

8. A process in accordance with claim 7, wherein the spoke elements in the hub area are provided in the step of closing the mold with moldings for absorbing forces.

9. A process in accordance with claim 7, wherein the first portion and the second portion of each end of the spoke elements are fitted axially in opposite directions into the mold to define in the step of braiding over of the closed mold a positive-locking connection to the rim well.

10. A process in accordance with claim 7, wherein the first portion and the second portion of each end of the spoke elements are fitted into the mold in opposite directions of rotation of the wheel to define in the step of braiding over of the closed mold a positive-locking connection to the rim well.

11. A process in accordance with claim 7, wherein each end of the spoke elements is located at a spaced location from another end of the spoke elements in the circumferential direction.

12. A process in accordance with claim 7, wherein the first end portion is located at a first distance from at least one of the two hub parts, the second end portion being located at a second distance from the at least one of the two hub parts, the first distance being greater than the second distance.

13. A process for manufacturing a wheel made of fiber composite material, the process comprising the steps of:
providing a mold;
inserting spoke elements into the mold, each of the spoke elements comprising one or more textile strands or layers of textile strands extending parallel to a longitudinal axis of the spoke elements, each of the spoke elements comprising a first spoke element end and a second spoke element end;
closing the mold after inserting the spoke elements into the mold, wherein the first spoke element end of each of the spoke elements is exposed in an area of a rim and the second spoke element end of each of the spoke elements is in contact with an adjacent second spoke element end in a hub area of the mold in a circumferential direction of the mold, the first spoke element end comprising a first end portion and a second end portion, the first end portion and the second end portion being fitted into the mold of a rim well, the mold forming a shape of the rim when the mold is in a closed state;
forming the rim well after the mold is closed, the second spoke element end of each of the spoke elements being arranged between two hub parts in an axial direction of the mold;
consolidating the spoke elements and the rim to form a wheel; and
releasing the wheel from the mold.

14. A process in accordance with claim 13, wherein the spoke elements in the hub area are provided in the step of closing the mold with moldings for absorbing forces.

15. A process in accordance with claim 13, wherein the first portion and the second portion of each first spoke element end of the spoke elements are fitted axially in opposite directions into the mold to define in the step of forming the rim well a positive-locking connection to the rim well.

16. A process in accordance with claim 13, wherein the first portion and the second portion of the first spoke element end of each of the spoke elements are fitted into the mold in opposite directions of rotation of the wheel to define in the step of forming the rim well a positive-locking connection to the mold of a rim inside.

17. A process in accordance with claim 13, wherein the first spoke element end of each of the spoke elements is located at a spaced location from the first spoke element end of another one of the spoke elements in the circumferential direction.

18. A process in accordance with claim 13, wherein the first end portion is located at a first distance from at least one of the hub parts, the second end portion being located at a second distance from the at least one of the hub parts, the first distance being greater than the second distance.

19. A process in accordance with claim 7, wherein the rim well comprises an outermost circumferential peripheral edge portion and an inner rim well portion located at a radially spaced location from the outermost circumferential peripheral edge portion with respect to a longitudinal axis of the rim well, the first end portion being located adjacent to the outermost circumferential peripheral edge portion, the second end portion being in contact with the inner rim well portion.

20. A process in accordance with claim 13, wherein the rim well comprises an outermost circumferential peripheral edge portion and an inner rim well portion located at a radially spaced location from the outermost circumferential peripheral edge portion with respect to a longitudinal axis of the rim well, the first end portion being located adjacent to the outermost circumferential peripheral edge portion, the second end portion being in contact with the inner rim well portion.

* * * * *